(12) United States Patent
Nikou et al.

(10) Patent No.: US 12,705,537 B2
(45) Date of Patent: Aug. 11, 2026

(54) METHODS AND APPARATUS FOR IMPLEMENTING REINFORCEMENT LEARNING

(71) Applicant: Telefonaktiebolaget LM Ericsson (publ), Stockholm (SE)

(72) Inventors: Alexandros Nikou, Danderyd (SE); Anusha Pradeep Mujumdar, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 598 days.

(21) Appl. No.: 18/272,956

(22) PCT Filed: Jan. 18, 2021

(86) PCT No.: PCT/EP2021/050957

§ 371 (c)(1),
(2) Date: Jul. 18, 2023

(87) PCT Pub. No.: WO2022/152404

PCT Pub. Date: Jul. 21, 2022

(65) Prior Publication Data

US 2024/0311687 A1 Sep. 19, 2024

(51) Int. Cl.
*G06N 20/00* (2019.01)
*H04L 41/0823* (2022.01)
*H04L 41/16* (2022.01)

(52) U.S. Cl.
CPC ......... *G06N 20/00* (2019.01); *H04L 41/0823* (2013.01); *H04L 41/16* (2013.01)

(58) Field of Classification Search
CPC . G06N 20/00; G06N 3/02; G06N 7/01; H04L 41/16; H04L 41/0823
See application file for complete search history.

(56) References Cited

U.S. PATENT DOCUMENTS

2018/0025291 A1* 1/2018 Dey ......................... G06N 7/01
706/11

OTHER PUBLICATIONS

Hasanbeig et al., "Cautious Reinforcement Learning with Logical Constraints", Mar. 21, 2020, arXiv:2002.12156v2 (Year: 2020).*

(Continued)

*Primary Examiner* — Tarek Elarabi
(74) *Attorney, Agent, or Firm* — Sage Patent Group

(57) ABSTRACT

Methods and apparatus for implementing reinforcement learning (RL) are provided. A method of operation for a node implementing RL, wherein the node instructs actions in an environment in accordance with a policy generated by a RL agent, wherein the RL agent models the environment and encodes a state of the environment using a set of features, comprises obtaining an intent, wherein the intent specifies one or more criteria to be satisfied by the environment. The method further comprises determining a Companion Markov Decision Process (CMDP) that encodes states of the environment using a subset of the set of features used by the RL agent. The method further comprises generating a finite state automaton that represents the intent as a series of logic states, and computing a product of CMDP output states and logic states, wherein the product contains all of the potential combinations of a CMDP output state and a logic state. The method further comprises selecting an action to be performed on the environment from one or more suggested actions obtained from the policy, the selection being based on the product of CMDP output states and logic state.

16 Claims, 7 Drawing Sheets

(56) References Cited

OTHER PUBLICATIONS

Quint et al., "Formal Language Constrained Markov Decision Processes" , Oct. 13, 2020, arXiv:1910.01074v3 (Year: 2020).*
Vannella et al., "Remote Electrical Tilt Optimization via Safe Reinforcement Learning", Jan. 15, 2021, arXiv:2010.05842v2 (Year: 2021).*
Lee et al., "Cognitive Network Management with Reinforcement Learning for Wireless Mesh Networks", 2007, Springer, IPOM 2007, LNCS 4786, pp. 168-179, 2007 (Year: 2007).*
Mohammadhosein Hasanbeig et al, "Cautious Reinforcement Learing With Logical Constraints", Arxiv.Org, Cornell University Library, 201 Olin Library Cornell University Ithaca, NY 14853, Feb. 26, 2020 (Feb. 26, 2020).
Eleanor Quint et al; "Formal Language Constraints for Markov Decision Processes", arxiv.org, Cornell University Library, 201 Olin Library Cornell Universtiy Ithaca, NY 14853, Oct. 2, 2019 (Oct. 2, 2019).
Filippo Vannella et al; "Remote Electrical Tilt Optimization via Safe Reinforcement Learning", arxiv.org, Cornell University Library, 201 Olin Library Cornell University Ithaca, NY 14853 KTH Royal Institute of Technology, Stockholm, Sweden; aiXiv:2010.05842v2 [cs.LG] Jan. 15, 2021.
Minsoo Lee et al; "Cognitive Network Management with Reinforcement Learing for Wireless Mesh Networks", Oct. 31, 2007 (Oct. 31, 2007), IP Operations and Management; [Lecture Notes in Computer Science], Springer Berlin Heidelberg, Berlin, Heidelberg, pp. 168-179, ISBN: 978-2-540-75852-5 The whole Document.
Comsa, Ioan-Sorin, Antonio De-Domenico, and Dimitri Ktenas. "Qos-driven scheduling in 5g radio access networks-a reinforcement learning approach." Globecom 2017—2017 IEEE Global Communications Conference. IEEE, 2017.
M. Alshiekh et al., "Safe Reinforcement Learning via Shielding", Thirty-Second AAAI Conference on Artificial Intelligence, Apr. 2018 (arXiv:1708.08611v2, Sep. 3, 2017).
Rodrigo Toro Icarte et al., "Using Reward Machines for High-Level Task Specification and Decomposition in Reinforcement Learning", Proceedings of 35th International Conference on Macine Learning, Proceedings of Machine Learning Research, 2018, pp. 2107-2111, vol. 80.
Wikipedia, "Depth-first search", downloaded Feb. 3, 2021.

* cited by examiner

Fig 1.

Agent

Environment action $A_t$ reward $R_t$ state $S_t$ $R_{t+1}$ $S_{t+1}$

Fig 2.

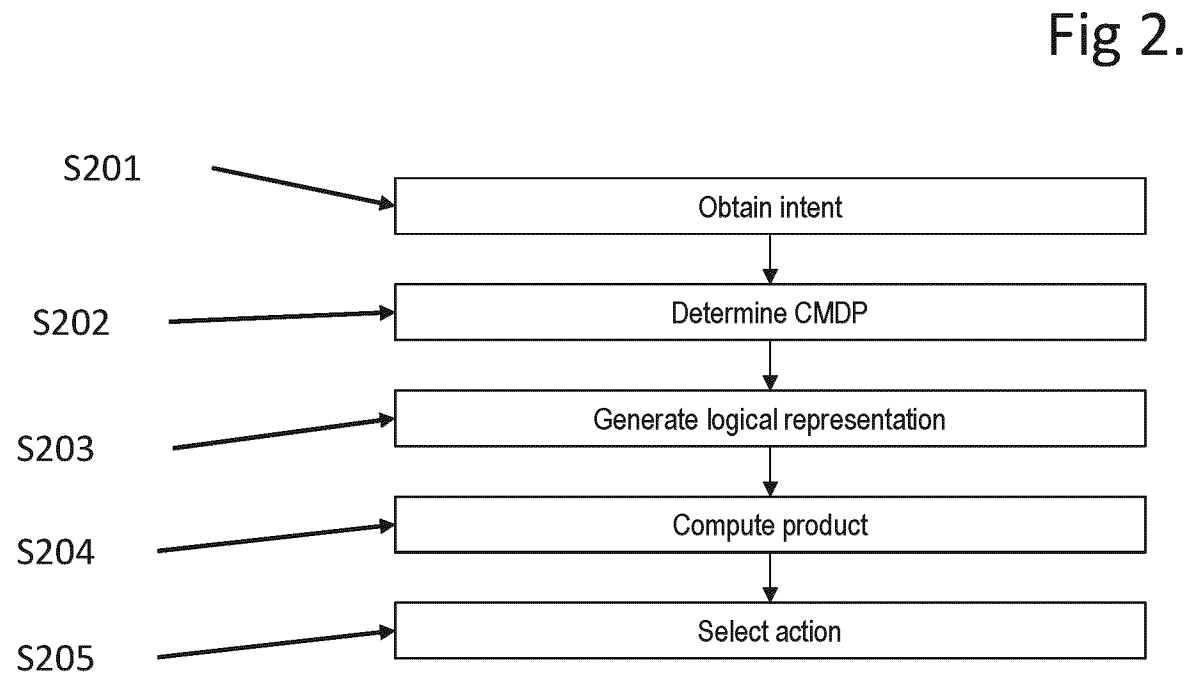

Obtain intent → Determine CMDP → Generate logical representation → Compute product → Select action

S201

S202

S203

S204

S205

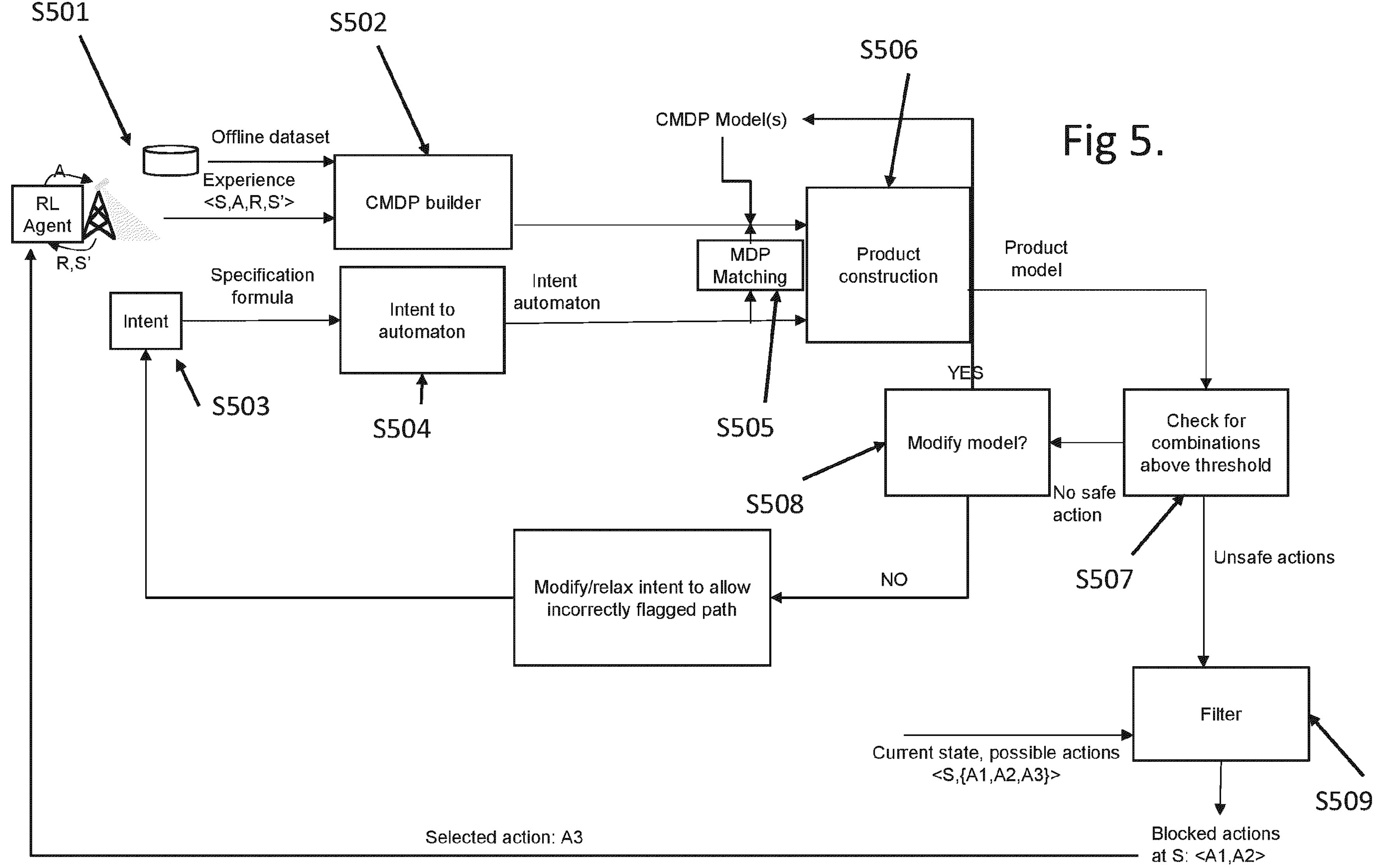
S501
S502
S506
CMDP Model(s)
Fig 5.
Offline dataset
A
RL Agent
Experience <S,A,R,S'>
CMDP builder
MDP Matching
Product construction
Product model
R,S'
Specification formula
Intent
Intent to automaton
Intent automaton
YES
S503
S504
S505
Modify model?
Check for combinations above threshold
S508
No safe action
Modify/relax intent to allow incorrectly flagged path
NO
S507
Unsafe actions
Filter
Current state, possible actions <S,{A1,A2,A3}>
S509
Selected action: A3
Blocked actions at S: <A1,A2>

METHODS AND APPARATUS FOR IMPLEMENTING REINFORCEMENT LEARNING

CROSS-REFERENCE TO RELATED DATA

This application is a national-phase entry under 35 USC § 371 of International Application No. PCT/EP2021/050957, filed Jan. 18, 2021, titled "Methods and Apparatus for Implementing Reinforcement Learning", the contents of which are hereby incorporated in its entirety.

TECHNICAL FIELD

Embodiments described herein relate to methods and apparatus for implementing Reinforcement Learning (RL), in particular for implementing RL while satisfying dynamic intents.

BACKGROUND

Management of complex systems, such as telecommunications networks, vehicular traffic management systems, and so on, is an ever-increasing challenge. In order to meet this challenge reinforcement learning (RL) techniques that enable effectiveness and adaptiveness may be implemented.

RL allows a Machine Learning System (MLS) to learn by attempting to maximise an expected cumulative reward for a series of actions utilising trial-and-error. RL agents (that is, a system which uses RL in order to improve performance in a given task over time) are typically closely linked to the system (environment) they are being used to model/control, and learn through experiences of performing actions that alter the state of the environment.

Figure 1:
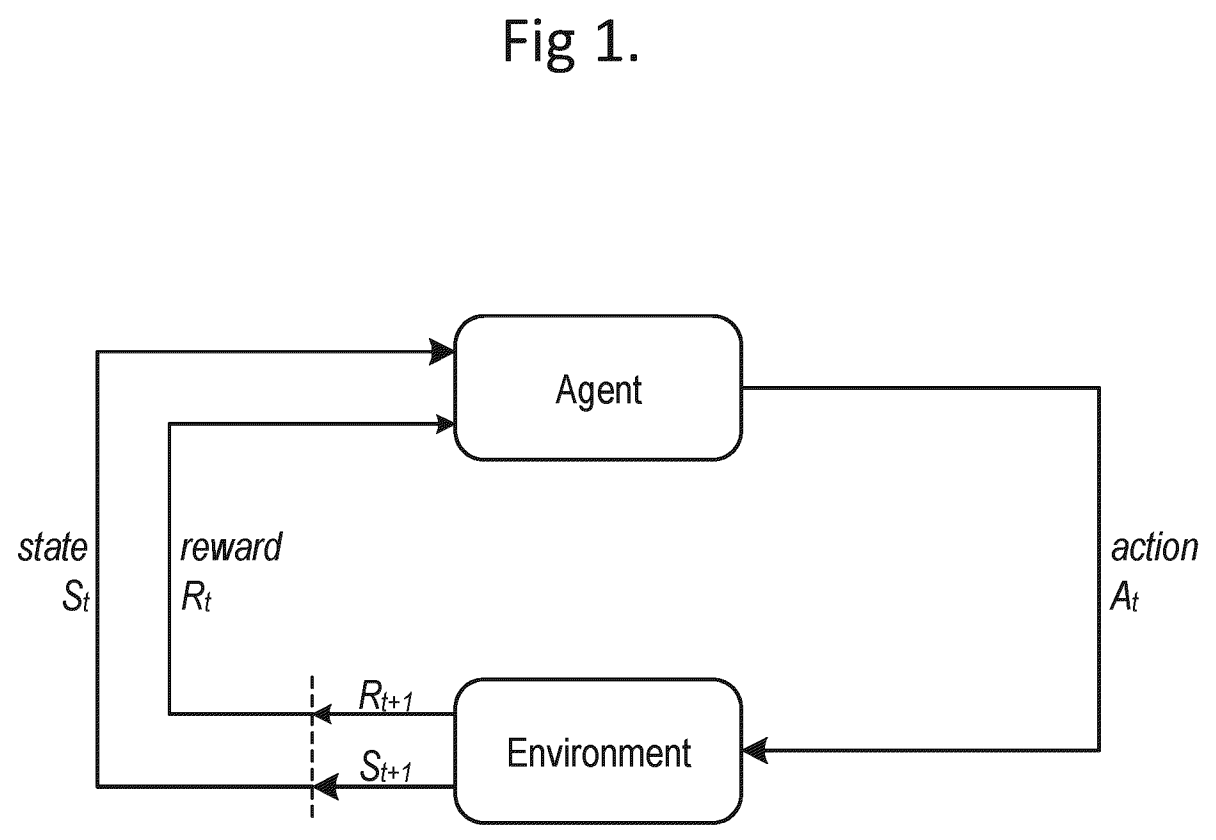

FIG. 1 illustrates schematically a typical RL system. In the architecture shown in FIG. 1, an agent receives data from, and transmits actions to, the environment which it is being used to model/control. For a time t, the agent receives information on a current state of the environment $S_t$. The agent then processes the information $S_t$, and generates one or more actions to be taken; one of these actions is to be implemented $A_t$. The action to be implemented is then transmitted back to the environment and put into effect. The result of the action is a change in the state of the environment with time, so at time t+1 the state of environment is $S_{t+1}$. The action also results in a (numerical, typically scalar) reward $R_{t+1}$, which is a measure of effect of the action $A_t$ resulting in environment state $S_{t+1}$. The changed state of the environment $S_{t+1}$ is then transmitted from the environment to the agent, along with the reward $R_{t+1}$. FIG. 1 shows reward $R_t$ being sent to the agent together with state $S_t$; reward $R_t$ is the reward resulting from action $A_{t-1}$, performed on state $S_{t-1}$. When the agent receives state information $S_{t+1}$ this information is then processed in conjunction with reward $R_{t+1}$ in order to determine the next action $A_{t+1}$, and so on. The action to be implemented is selected by the agent from actions available to the agent with the aim of maximising the cumulative reward. RL can provide a powerful solution for dealing with the problem of optimal decision making for agents interacting with uncertain environments. RL typically performs well when deriving optimal policies for optimising a given criterion encoded via a reward function. However, this strength of RL can also be a limitation in some circumstances. A given RL agent, once trained, cannot be directly utilized to effectively optimise for a criterion that is different from the criterion used in training the given RL agent. Also, existing RL agents can be ineffective if the criterion to be maximised consists of more complex specification than a simple reward maximization.

Intent-driven cognitive architectures such as cognitive layers, can be used to reflect more complex requirements. An intent is a formal specification of all expectations, including requirements, goals and constraints given to a technical system. Intents are often dynamic, that is, vary with time based on changing user requirements. An example of a generic intent would be, for arbitrary criteria X and Y and arbitrary numerical values A and B, "the value of X must remain below A and the value of Y must remain above B". More definite examples, in the context of telecommunications systems, are: "the value of the signal to interference plus noise ratio (SINR) must remain below 0.2 and the network coverage must remain above 90%", and "if the value of the SINR goes below 6, the network coverage must remain above 80% for the next 2 time steps". The above examples are comparatively simple; those skilled in the art will be aware that more complex intents may be used in some systems.

The complex criteria, including logical constraints, imposed by some intents cannot be directly handled by RL agents; as discussed above RL agents can only optimize given a reward maximization criterion over a given time period.

"Using Reward Machines for High-Level Task Specification and Decomposition in Reinforcement Learning" by Icarte, R. T., et al., PMLR vol. 80, available at proceedings.mlr.press/v80/icarte18a.html as of 13 Jan. 2021, discloses the use of a type of finite state machine referred to as Reward Machines, wherein the Reward Machines can be used with specified reward functions and Q-Learning to converge on an optimal policy. The approach discussed in "Using Reward Machines for High-Level Task Specification and Decomposition in Reinforcement Learning" requires significant reward engineering, which requires substantial expert effort and knowledge for each new environment and use case. Also, this approach cannot effectively be used to handle complex logical constraints.

SUMMARY

It is an object of the present disclosure to provide methods, apparatus and computer-readable media which at least partially address one or more of the challenges discussed above. In particular, it is an object of the present disclosure to facilitate the implementation of RL while satisfying dynamic intents.

The present disclosure provides methods and apparatus for implementing RL, in particular for implementing RL while satisfying dynamic intents.

An aspect of an embodiment provides a method of operation for a node implementing RL, wherein the node instructs actions in an environment in accordance with a policy generated by a RL agent and wherein the RL agent models the environment and encodes a state of the environment using a set of features. The method comprises obtaining an intent, wherein the intent specifies one or more criteria to be satisfied by the environment. The method further comprises determining a CMDP that encodes states of the environment using a subset of the set of features used by the RL agent, and generating a finite state automaton that represents the intent as a series of logic states. The method further comprises computing a product of CMDP output states and logic states, wherein the product contains all of the potential combinations of a CMDP output state and a logic state, and selecting an action to be performed on the environment from one or more suggested actions obtained from the policy. The selection is based on the product of CMDP output states and logic states. By incorporating the intent into the RL agent decision making, the method may improve the reliability of the actions selected for implementation in the environment, and may also provide increased flexibility and control over the RL agent decision making and/or training.

The determined CMDP may encode states of the environment using the features that influence the one or more criteria to be satisfied by the environment as specified by the intent. In this way, the intent may be effectively incorporated into the decision making process.

The step of selecting an action may further comprise determining if any actions, from the one or more suggested actions obtained from the policy, have a probability above a predetermined threshold of causing a criterion from among the one or more criteria to be satisfied by the environment to be violated, based on the combinations of a CMDP output state and a logic state. If a combination of a given CMDP output state and given logic state has a probability above the predetermined threshold of causing a criterion from among the one or more criteria to be satisfied by the environment to be violated, actions linked to the given CMDP output state may be prevented from being selected. In this way, the reliability of the RL agent may be improved.

The environment may be at least a part of a telecommunications network, a base station of the telecommunications network may comprise the node, the set of features encoding a state may comprise one or more of: base station configuration measurements; signal to interference plus noise ratios, SINR; capacity measurements; coverage measurements; and Quality of Service, QoS measurements, and the suggested actions may comprise one or more of: antenna configuration alterations; transmission parameter adjustments; and data traffic routing or rerouting alterations. Aspects of embodiments of the present disclosure may be particularly well suited to use in telecommunications network environments.

A further aspect of an embodiment provides a node for implementing reinforcement learning, RL, wherein the node is configured to instruct actions in an environment in accordance with a policy generated by a RL agent and wherein the RL agent models the environment and encodes a state of the environment using a set of features. The node comprises processing circuitry and a memory containing instructions executable by the processing circuitry. The node is operable to obtain an intent, wherein the intent specifies one or more criteria to be satisfied by the environment. The node is operable to determine a Companion Markov Decision Process, CMDP, that encodes states of the environment using a subset of the set of features used by the RL agent, and generate a finite state automaton that represents the intent as a series of logic states. The node is further operable to compute a product of CMDP output states and logic states, wherein the product contains all of the potential combinations of a CMDP output state and a logic state. The node is also operable to select an action to be performed on the environment by the node from one or more suggested actions obtained from the policy, the selection being based on the product of CMDP output states and logic states. The node may provide one or more of the advantages discussed in the context of the corresponding method.

BRIEF DESCRIPTION OF DRAWINGS

The present disclosure is described, by way of example only, with reference to the following figures, in which:—

FIG. 1 is a schematic diagram of a RL system;

FIG. 2 is a flowchart of a method performed by a node in accordance with aspects of embodiments;

FIG. 5 is a flowchart showing a method in accordance with an aspect of an embodiment.

DETAILED DESCRIPTION

Figure 3A:
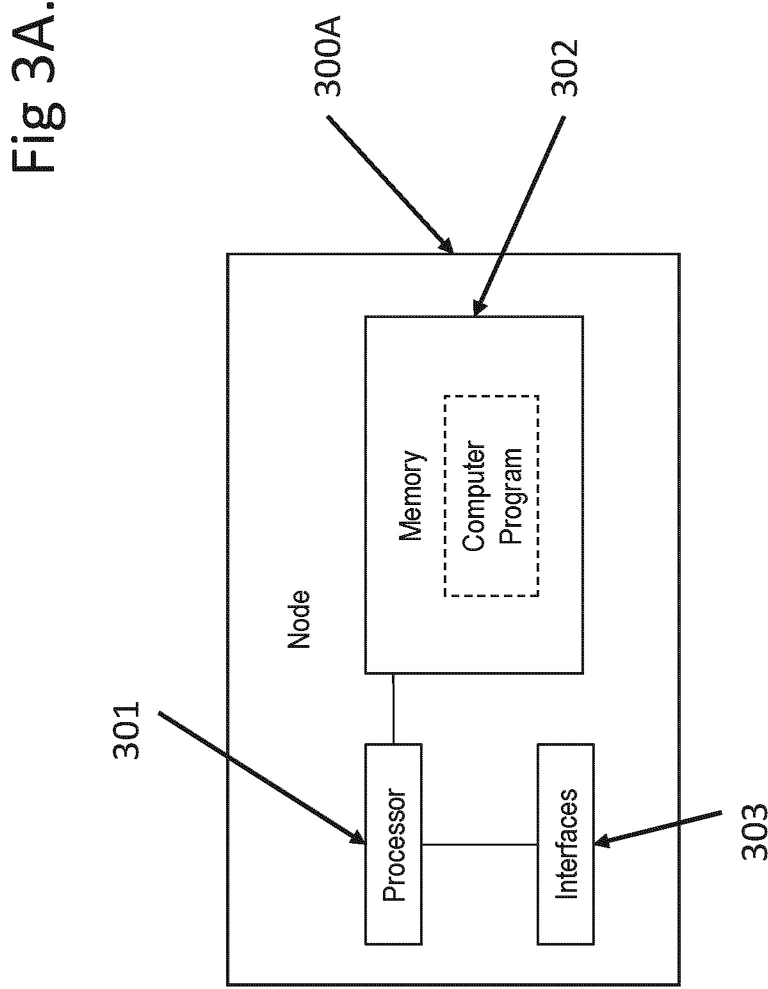
FIGS. 3A and 3B are schematic diagrams of nodes in accordance with aspects of embodiments.

For the purpose of explanation, details are set forth in the following description in order to provide a thorough understanding of the embodiments disclosed. It will be apparent, however, to those skilled in the art that the embodiments may be implemented without these specific details or with an equivalent arrangement.

A method in accordance with aspects of embodiments is illustrated by FIG. 2, which is a flowchart showing an operation method of a node for implementing RL, wherein the node instructs actions in an environment in accordance with a policy generated by a RL agent, and wherein the RL agent models the environment and encodes a state of the environment using a set of features. The nature of the node, actions, environment and policy are dependent on the specific system in which the method is used; taking the example where the environment is a telecommunications network (or part of the same), the node may be a base station or core network node (or may be incorporated in a base station or core network node), and the policy (generated by the RL agent based on the environment modelling) may cause the node to instruct actions such as rerouting traffic in the telecommunications network, increasing network capacity, altering transmission parameters, altering antenna pitch and so on. As a further example, the environment may be a traffic management system (or part of the same), the client may be the controller for one or more traffic lights, and the policy may determine the lighting sequence used for the lights to reduce congestion.

Prior to implementing the method as shown in FIG. 2, experience data for use by the RL agent is required. Different method may be used to gather the experience data, depending on the specific environment and system in which the method is to be performed. Experience data may be gathered using model free reinforcement learning algorithms. Examples of suitable model free reinforcement learning algorithms include Deep Q Networks (DQN) and State-action-reward-state-action algorithms. Those skilled in the art will be familiar with suitable model free reinforcement learning algorithms. Model free reinforcement learning is similar to standard reinforcement learning except that no model of the system is retained, and the actions to be performed may be selected essentially at random and the set of states of the environment is thereby generally explored without a specific objective. The environment used may be a real world environment (such as all or part of a telecommunications network, as discussed above), or a simulation of a real world environment. Alternatively, if experience data is available showing the effects of actions on states of an environment (for example, due to stored measurements of an environment over a period of time, as may be obtained by monitoring a telecommunications network), then either the use of model free reinforcement learning may not be required, or the stored and gathered experience data may be combined to provide a larger reserve of experience data.

Depending on the nature of the environment and of the experience data to be used, it may be necessary to discretize the experience data. Where a feature provides continuous data (rather than discrete data), it is not possible to treat each different value of the feature as a separate condition, as this would result in an infinite number of conditions for the feature. For example, if a given feature can take values on a continuum between 0 and 1, then depending on the accuracy with which the feature value is measured the recorded feature values may take a potentially infinite number of different values between 0 and 1. In order to provide data that can be effectively worked with, the data may be discretized. Taking the same given feature with values between 0 and 1, the feature values may be grouped (also referred to as "binned") into three discrete groupings (also referred to as "bins"), where x is the feature value: $0 \leq x < 0.3$, $0.3 \leq x < 0.7$ and $x \geq 0.7$. The number of groupings used and the respective range of feature values included in each grouping is dependent on the nature of the environment and of the particular feature value. The different groupings are not necessarily of approximately equal size. Returning to the given feature discussed above, it may be the case that the feature value is known to typically be in the range of 0.9 to 1, and the proximity of the value to 1 is of some importance to the state of the environment. In this instance the groupings used may be, for example: $0 \leq x < 0.90$, $0.90 \leq x < 0.93$, $0.93 \leq x < 0.95$, $0.95 \leq x < 0.97$, $0.97 \leq x < 0.98$, $0.98 \leq x < 0.99$, $0.99 \leq x < 0.995$ and $x \geq 0.995$. The number of groupings used and the respective range of feature values included in each grouping may be determined based on the distribution of values for a particular feature in an obtained set of experience data, and/or may be determined based on expert input. Where a feature provides discrete data, grouping may still be used in order to reduce the number of states. Each entry of the experience data is used in the form (S, A, R, S'), where S is the current state of the environment that is encoded by a state vector of features $S=[x_1, x_2, \ldots, x]$(where each feature x has a feature value as discussed above), A is the action performed on the environment, S' is the resulting state of the environment following action A that is represented by a state vector of features $S'=[x_1', x_2', \ldots, x_n']$, and R is a reward that would be obtained by a RL agent due to the transition between current state S and resulting state S'; the reward R depends on the criteria a RL agent seeks to optimize, and therefore is specific to a RL agent. Accordingly, the reward may be calculated by analyzing the feature values of the current and resulting states S, S', and may not be initially present in experience data. For the purposes of processing the experience data, each of the features $x_1$, $x_2, \ldots, x_n$ has a number of possible values equal to the number of groupings (or bins), and the total state space is the number of different potential combinations of feature values of all of the states. Using a simple example of a state $S_E$ having two features $$[x_1^E, x_2^E]$$

where $$x_1^E$$

comprises 3 groupings $$\left(N_{x_1^E} = 3\right)$$

and $$x_2^E$$

comprises 4 groupings $$\left(N_{x_2^E} = 4\right),$$

the total state space of $$S_E = \left(N_{x_1^E}\right)^{\left(N_{x_2^E}\right)} = (3)^{(4)} = 81.$$

The different combinations of feature 1 group and feature 2 group may each be given a state indicator $s_x$; there would then be 81 states $s_1, s_2, \ldots s_{81}$. In practice, states will typically be encoded using more than two features, and each feature may have a large number of groupings, so the total state space used to encode a state of an environment can be large.

The method shown in FIG. 2 may be used to select an action to be performed by a trained RL agent in accordance with policy, or may be used during the training of a RL agent/generation of policy (for example, to ensure safe exploration of an environment during training where the training is performed on a real world environment).

Figure 3B:
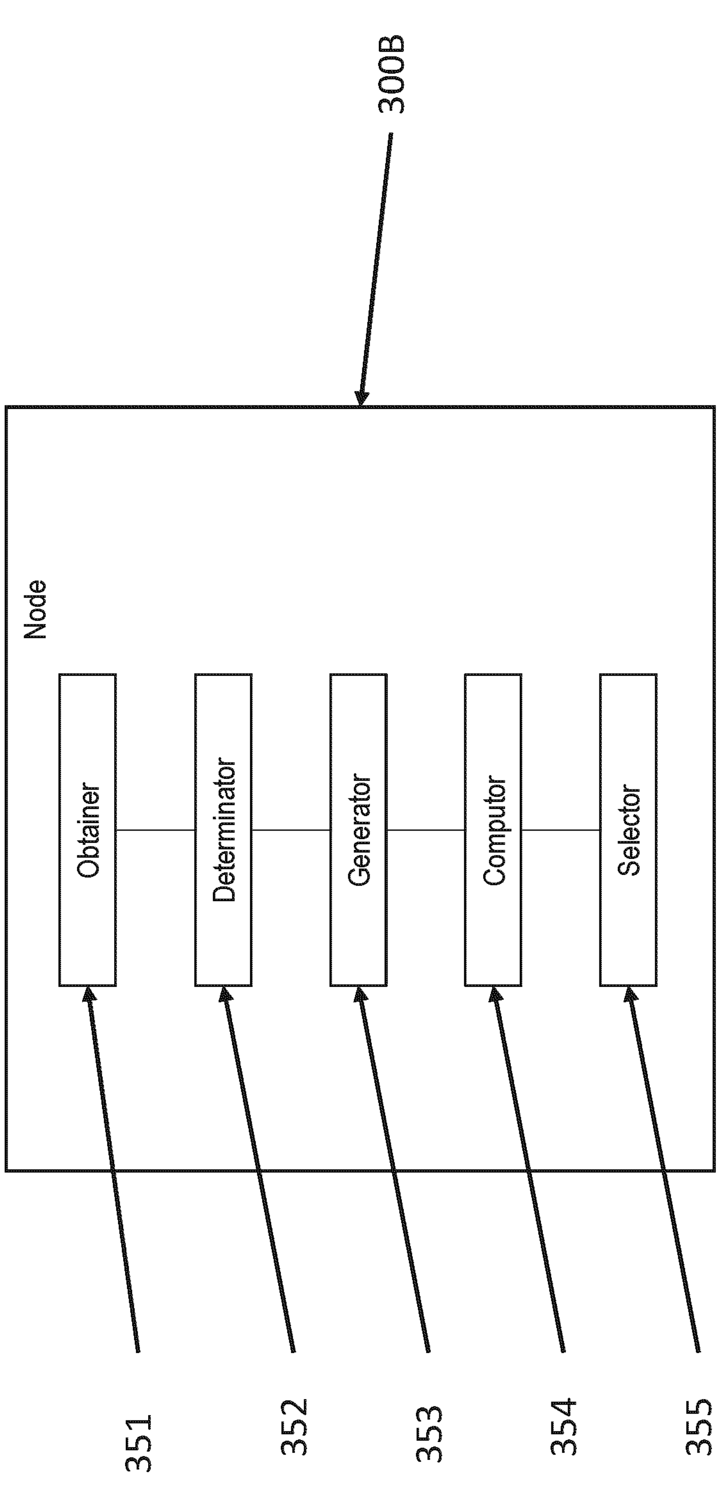

The method shown in FIG. 2 is performed by a node. Any suitable node may be used; FIG. 3A and FIG. 3B show nodes 300A, 300B in accordance with aspects of embodiments. The nodes 300A, 300B may perform the method of FIG. 2. In some aspects of embodiments, the environment may be all or part of a telecommunications network; where this is the case the node may be a node in the network, such as a base station or core network node. The telecommunications network may be a $3^{rd}$ Generation Partnership Project (3GPP) 4th Generation (4G) or 5th Generation (5G) network. The node may be or form part of a Core Network Node (CNN), or may be or form part of a base station (which may be 4th Generation, 4G, Evolved Node Bs, eNB, or 5th Generation, 5G, next Generation Node Bs, gNBs, for example). Further the features encoding a state may include base station configuration measurements, signal to interference plus noise ratios (SINR) and/or other key performance indicators, capacity measurements, coverage measurements, Quality of Service (QOS) measurements, and so on. Also, actions suggested by a RL agent may include antenna configuration adjustments (such as antenna positioning changes), transmission parameter adjustments; data traffic routing or rerouting alterations; and so on. Aspects of embodiments therefore provide a unified system for incorporating logical intents, domain guidance, and safety constraints into RL agents. Also, although the RL agent's reward function remains the same, logical intents can guide the exploration/inference of the agent, thereby increasing versatility.

As shown in step S201 of FIG. 2 the method comprises obtaining an intent. The intent may be inputted into the node (for example, by a user), may be transmitted to the node, or may be obtained from a memory containing stored intents (which may be part of, or separate from, the node). The intent may encompass any criteria to be satisfied by the environment; using the example of a telecommunications network the intent may include technical criteria (such as maintaining SINR below a certain level), safety specifications (such as ensuring a minimum level of coverage and capacity), domain guidance for RL training (such as "Eventually, it is always the case that: Coverage, once high, does not go back to low AND Capacity, once high, does not go back to low), and so on.

The intent may be obtained by the node in the form of a natural language statement, or may be obtained as a logical specification using logical symbols. Where the intent is obtained as a natural language statement, it may be converted into a logical specification. An example of a natural language statement of an intent, in the context of a telecommunications network, is "SINR, network coverage and received signal quality are never degraded together". A logical specification corresponding to the above natural language statement, using linear temporal logic symbols, would be $\square(\neg(\text{SINRLow}\wedge\text{covLow}\wedge\text{quaLow}))$, where is a logical "always" operator, ¬ is a logical "not" operator, ∧ is a logical "and" operator, SINRLow indicates a low average SINR, covLow indicates a low network coverage and quaLow indicates a low average received signal quality. In this example, the environment is all or part of a telecommunications network; the state of the environment would be encoded by a RL agent using a set of features representing the state of the network, such as the average SINR, network coverage, average received signal quality, total network capacity, and so on. Additional logical specifications are discussed below. The step of obtaining the intent may be performed in accordance with a computer program stored in a memory 302, executed by a processor 301 in conjunction with one or more interfaces 303, as illustrated by FIG. 3A. Alternatively, the step of obtaining the intent may be performed by an obtainer 351 as shown in FIG. 3B.

The method further comprises determining a Companion Markov Decision Process (CMDP) that encodes states of the environment using a subset of the set of features used by the RL agent, as shown in step S202. CMDPs, are a modified implementation of Markov Decision Processes (MDPs) that may be used to incorporate logical intents into the RL process, in particular, to assist in the selection of actions that are compliant with the intent. A MDP is a tuple of the general form (S, A, Pa, Ra), where S is the set of states, A is the set of actions available in state s, Pa is the probability that performing action a when in state s will result in state s', and Ra is the reward for transitioning from state s to state s'. MDPs are typically used to model decision processes that are partially random, particular where Q-learning is implemented. MDPs are state-action discrete models, which model transitions between states of an environment as a result of actions performed on the environment.

CMDPs are based on MDPs, differing in that CMDPs do not encode the state transitions in terms of the full set of state features. As an example of this, an environment state having features $x_1, x_2 \ldots, x_n$ may be encoded by state vector S having features $S=[x_1, x_2, \ldots, x_n]$ (where each feature has a feature value, the set of feature values collectively defining the state), as discussed above. A typical MDP would encode, or represent, the state using all of the features $x_1, x_2 \ldots, x_n$. By contrast, a CMDP (cmdp1) may encode the same state using a subset of the features, e.g., $S\_cmdp1=[x_2, x_4, x_5]$. Similarly for the next state $S'\_cmdp1=[x'_2, x'_4, x'_5]$. When generating the CMDP, only the subset of relevant features is considered, so in the example of cmdp1 for the experience data (S, A, R, S') where $S=[x_1, x_2, \ldots, x_n]$ and $$S' = [x'_1, x'_2, \ldots , x'_n]$$

the relevant experience data used to generate the CMDP would be $[x_2, x_4, x_5]$, A, R, $[x_2', x_4', x_5']$). If the experience data has not already been discretized, and this is necessary, discretization may be performed at this stage. Using the state indicator notation $s_x$ as explained above to encode the states in terms only of the relevant features $x_2$, $x_4$, $x_5$, and representing the different actions as A1, A2, and so on, the experience data can then be represented in the form $<s_2,A1,s_5>$, $<s_5,A2,s_1>$, $<s_1,A1,s_2>$, $<s_2,A1,s_4>$, and so on. To complete the CMDP, it is necessary to calculate the transition probabilities matrix Tr. The transition probabilities matrix indicates the probabilities starting from current state $s_i$ that taking action Aj will cause resulting state $s_k$, for all available values of i, j and k. Tr may therefore be considered as a 3-dimensional matrix of size i×j×k. The values of Tr for each pair of current and resultant states is calculated by adding up the number of times a transition occurred from the current to resultant state in the experience data, and dividing by the total number of transitions from the current state.

There could be several other CMDPs (cmdp2, cmdp3, and so on) with various subsets of state features e.g. $S_{cmdp2}=[x_1, x_3, x_5]$, $Scmdp3=[x_3, x_5, x_6]$ and so on. In the above example, if only features $x_2$, $x_4$ and $x_5$ have a bearing on the given intent, then cmdp1 may be selected to help implement the given intent. By utilizing a subset of the features to encode states of the environment, the state space complexity may be reduced relative to the requirements of a typical MDP and the computational requirements of calculating state transitions are correspondingly reduced.

In order to determine the subset of features to be used by the CMDP when encoding states of the environment, the intent may be used. In particular, the CMDP may be determined based on the features used by the RL agent that influence the one or more criteria to be satisfied by the environment. In some aspects of embodiments, the determined CMDP encodes states of the environment using the features that influence the one or more criteria to be satisfied by the environment as specified by the intent. Determining a CMDP that encodes states using the features that influence the criteria to be satisfied by the environment as specified by the intent may be the most effective way to ensure that the CMDP fully takes into account what is necessary to satisfy the intent. Continuing with the example discussed above wherein a RL agent uses a set of features to represent the state of the network such as: the average SINR, network coverage, average received signal quality, total network capacity, and so on, a CMDP that encodes states using the subset of: average SINR, network coverage, and average received signal quality may be used. This subset of features is well matched to the intent "SINR, network coverage and received signal quality are never degraded together", as discussed above.

The step of determining the CMDP may be performed in different ways, depending on the particular configuration of the system. In some aspects of embodiments, a MDP builder may be used to create a set of CMDPs in advance of an intent being obtained, wherein the different CMDPs within the set encode states using different subsets of features from the full set of state features. As an example of this, the CMDPs discussed above (cmdp1, cmdp2, cmdp3, and so on) may be created in advance. When an intent is subsequently obtained, a suitable CMDP from the created CMDPs may then be selected, for example, based on the one or more criteria specified in the intent. The selection may be made by a MDP matching component. As an alternative to the creation of CMDPs in advance of an intent being obtained, a suitable CMDP may be derived once the intent has been obtained; this process would involve selecting features based on the criteria in the intent, and then using the experience data to perform count and normalisation operations to obtain the probabilities of state transitions for given actions. The step of determining a CMDP may be performed in accordance with a computer program stored in a memory 302, executed by a processor 301 in conjunction with one or more interfaces 303, as illustrated by FIG. 3A. Alternatively, the step of determining a CMDP may be performed by a determinator 352 as shown in FIG. 3B.

Figure 4:
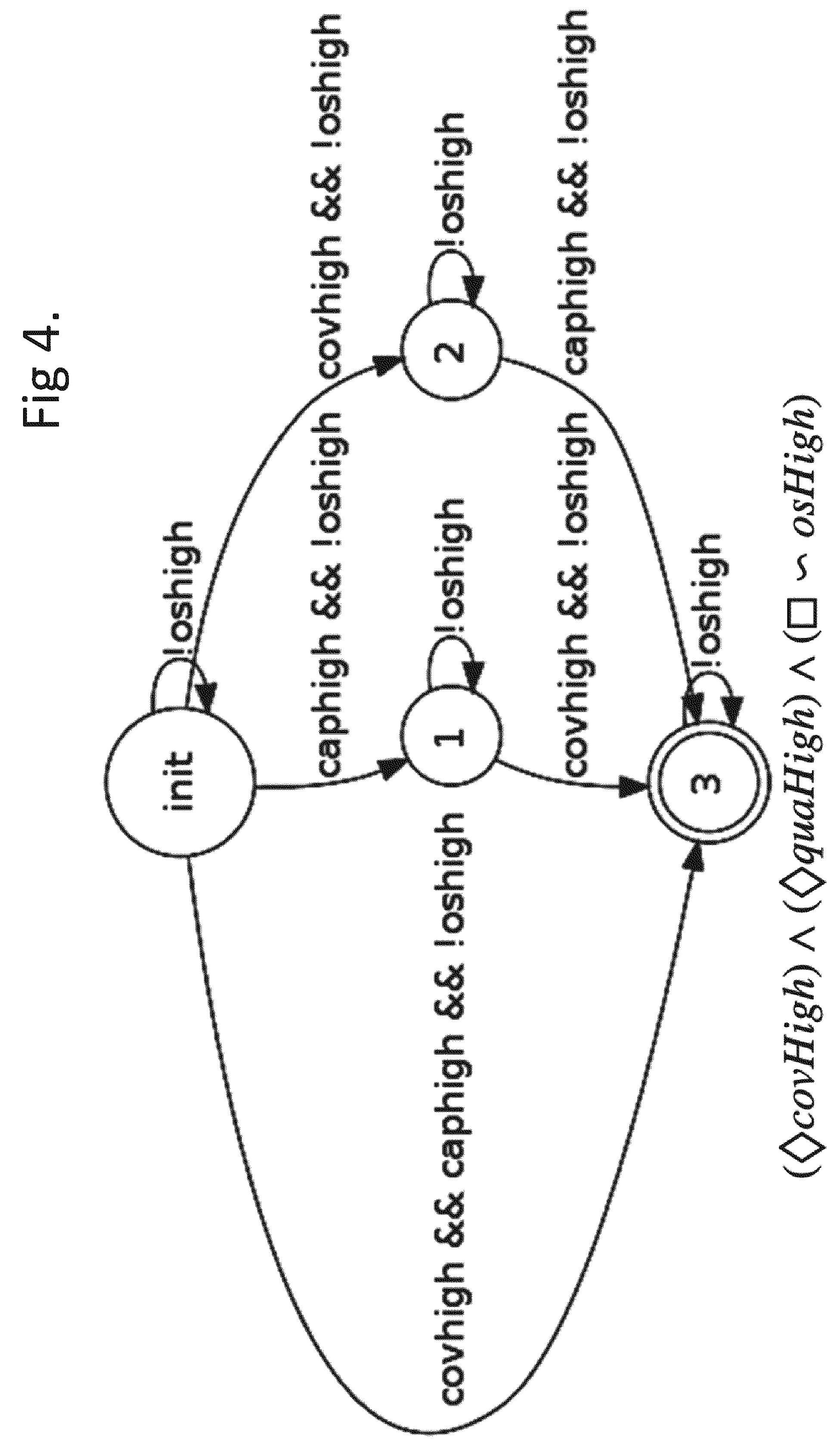
FIG. 4 is a diagrammatic representation of an example finite state automaton according to an aspect of an embodiment.

At step S203, a finite state automaton that represents the intent as a series of logical states is generated. A finite state automaton can be used to mathematically model relationships between states; the finite state automaton can have a plurality of logical states but can only occupy one of these states at a given time. Transitions between states are triggered by inputs into the finite state automaton. A diagrammatic representation of an example finite state automaton according to an aspect of an embodiment is shown in FIG. 4. The finite state automaton in FIG. 4 relates to an intent for the environment of all or part of a telecommunications network, specifically FIG. 4 relates to the implementation of cell-shaping (antenna tilt) in a Radio Access Network (RAN) and represents the intent "Eventually coverage should be high, quality should be high and always the overshoot should be not high". As a logical specification, this intent is $(\Diamond \text{covHigh}) \wedge (\Diamond \text{quaHigh}) \wedge (\Box \neg \text{osHigh})$, where $\Box$ is a logical "always" operator, $\neg$ is a logical "not" operator, $\wedge$ is a logical "and" operator, $\Diamond$ is a logical "eventually" operator, covHigh indicates a high network coverage, quaHigh indicates a high average received signal quality and osHigh indicates a high overshoot (of an antenna). As can be seen in FIG. 4, the finite state automaton representing this logical specification has four logical states, labelled as "init", 1, 2 and 3 in FIGS. 4, and 9 action combinations (represented by arrows). The state "init" is the starting point, and the state which fully satisfies the intent is state 3. The criterion $(\Box \neg \text{OsHigh})$ requires that losHigh is always true; each state has an action choice which simply maintains this criterion. Accordingly starting from state "init": if a "quaHigh" action is taken in conjunction with "not osHigh" the finite state automaton is then in state 1; if a "covHigh AND quaHigh" action is taken in conjunction with "not osHigh", the finite state automaton is then in state 3; and if a "covHigh" action is taken in conjunction with "not osHigh", the finite state automaton is then in state 2. From state 1, in order for the intent to be satisfied, the next action should be "covHigh" (and also "not osHigh"), the finite state automaton is then in state 3. From state 2, in order for the intent to be fullfiled, the next action should be "quaHigh" (and also "not osHigh"), the finite state automaton is then in state 3. The finite state automaton thereby encodes all of the logical states resulting from the intent, and the actions causing transitions between states. The step of generating a finite state automaton may be performed in accordance with a computer program stored in a memory 302, executed by a processor 301 in conjunction with one or more interfaces 303, as illustrated by FIG. 3A. Alternatively, the step of generating a finite state automaton may be performed by a generator 353 as shown in FIG. 3B.

When the finite state automaton has been generated, the method then comprises, at step S204 computing a product of the logic states (of the finite state automaton) with the CMDP output states, wherein the product contains all of the potential combinations of a CMDP output state and a logic state. Typically, the product of the logic states and the CMDP output states is a Cartesian product. Each of the determined CMDP output states may be linked to an action from among the suggested actions obtained from the policy. The product thereby models all of the behaviours of the environment in response to actions that may be performed by the RL agent following policy, over the intent. The product may be visualised as a graph having a number of states equal to the product of the logic states and CMDP output states, for example, if the CMDP has 10 output states and the finite state automaton has 4 logic states, the product graph would comprise 40 states. The product can then be used to perform model checking in order to compute unsafe actions, that is, actions which would contravene the intent. The model checking can be done using a value-iteration algorithm on the product followed by a Depth-first Search (DFS) algorithm. The result of the model checking is the identification of actions, amongst the actions available to the RL agent, likely to cause intent violation. This information can then be used to filter the actions suggested by the policy that are available to the RL agent for selection, such that the logical intent is satisfied by the actions selected for performing on the environment. Returning to the example shown in FIG. 4 if, for a given state of the environment (telecommunications network) a policy suggests available actions A, B, C and D and the model checking on the product of the logic states and CMDP output states indicated that action C would likely result in a high overshoot of the antenna, the RL agent could be blocked from selecting action C. The blocking could take the form of a whitelist of allowable actions (for example "actions A, B and D are allowable"), a blacklist of blocked actions (for example, "action C is blocked") or any other suitable form. The step of computing a product of CMDP output states and logic states may be performed in accordance with a computer program stored in a memory 302, executed by a processor 301 in conjunction with one or more interfaces 303, as illustrated by FIG. 3A. Alternatively, the step of computing a product of CMDP output states and logic states may be performed by a computer 354 as shown in FIG. 3B.

The determination as to whether or not to block a suggested action from being selected may be based on a predetermined probability threshold, that is, if a combination of a given CMDP output state and given logic state has a probability above the predetermined threshold of causing a criterion from among the one or more criteria to be satisfied by the environment to be violated, actions linked to the given CMDP output state may be prevented from being selected. The predetermined probability threshold may be set depending on the specific system configuration and environment, taking into account factors such as the severity of an intent being violated. As an example of this, if an intent relates to user safety and violation could lead to danger to users, the threshold may be set to 0% such that any chance of the intent being violated if a given action is taken would lead to that given action being blocked; in this way the reliability of a RL agent may be increased. Alternatively, the threshold may be set to 1% where consequences of intent breach are serious but not dangerous, or 20% if consequences are negative but not serious. As explained above, the specific values may be set depending on various factors.

As shown in step S205, an action to be performed on the environment may then be selected from the one or more available actions suggested by a policy, taking into account the actions that are blocked based on the intent (product of the logic states and CMDP output states). Typically, available actions will remain after any blocked actions have been discounted (in some instances the product of the logic states and CMDP output states may indicate that all available actions are in accordance with the intent, in which case no actions are blocked), in which case an action may be selected from the available actions based on any suitable measure including at random. However, in some instances none of the suggested actions obtained from the policy may have a probability below the predetermined threshold; this is more likely where the predetermined threshold is set at a low percentage level, such as 1%. Where all of the available actions have a probability above the predetermined threshold, this may initially result in all of the actions suggested by the policy being blocked, and therefore no actions being available for selection. If no actions are available for selection, there are several further steps which may be performed. A default safe action, which may be a legacy algorithm or product decision (based on actions previously implemented on an environment) may be selected. Alternatively, the method may comprise relaxing the criteria in the intent and repeating the determining, generating, computing and selecting steps using the relaxed criteria; for example, if the initial intent included a criterion of a SINR of above 95% and all suggested actions were blocked, the determining, generating, computing and selecting steps could be repeated using the relaxed criterion of a SINR of above 90%. A further alternative is to increase the predetermined threshold and repeat the selecting step; for example if none of the suggested actions have a probability below 1% of causing a criterion from among the one or more criteria to be satisfied by the environment to be violated, this threshold may be increased to 5%. A still further alternative is to select the action from among the suggested actions having the lowest probability of causing a criterion from among the one or more criteria to be satisfied by the environment to be violated. One further situation in which no allowable actions will be identified is where the intent itself is conflicted (for example, specifying that a given value must be maintained above 10, and also maintained below 5). If a product graph is used, conflicting intents can easily be identified as there will be no allowable actions. The step of selecting an action to be performed may be performed in accordance with a computer program stored in a memory 302, executed by a processor 301 in conjunction with one or more interfaces 303, as illustrated by FIG. 3A. Alternatively, the step of step of selecting an action to be performed may be performed by a selector 355 as shown in FIG. 3B.

Figure 6:
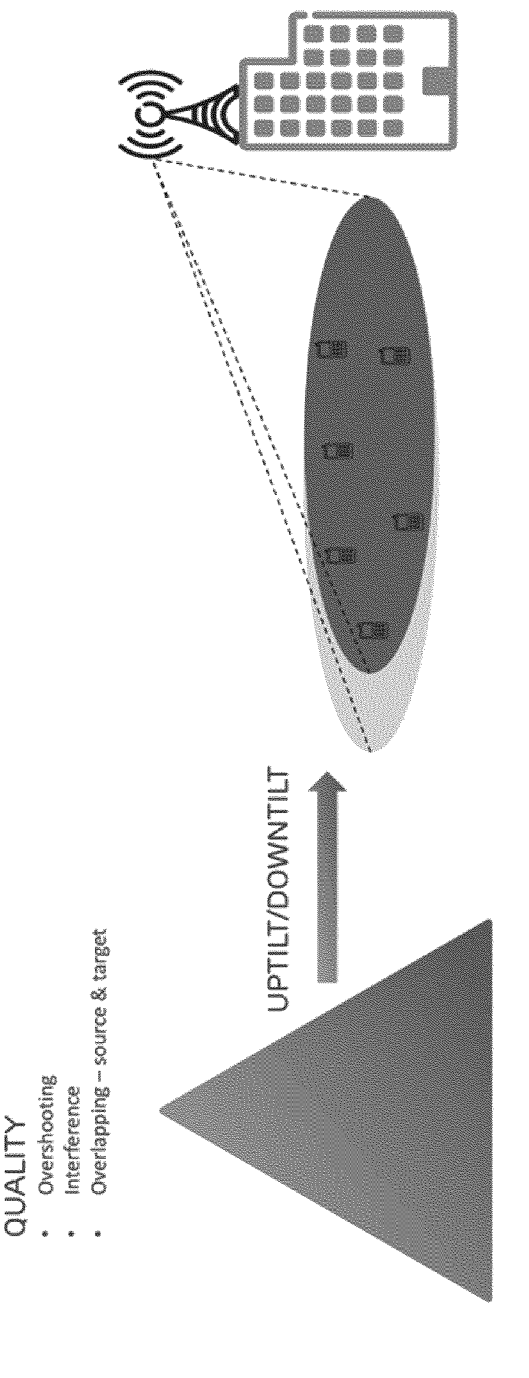
FIG. 6 is an overview diagram of considerations relating to antenna tilt control in accordance with an aspect of an embodiment.

FIG. 5 is a flowchart showing a method in accordance with an aspect of an embodiment. In this example, the RL agent is used to control cell-shaping in the environment of a telecommunications network. RL agents (that control antennas) are used to specify actions controlling antenna tilt such that a list of Key Performance Indicators (KPIs, such as coverage, no interference, overshooting, capacity, and so on) are optimized and user Quality of Experience (QoE) is maintained at an acceptable level. An overview diagram summarizing some of the considerations of this environment and application of RL agents can be found in FIG. 6.

In step S501, a RL agent generates experience data, which is sent to a CMDP builder (in the aspect of an embodiment shown in FIG. 5, the experience data is supplemented with an offline dataset). The CMDP builder then uses the received data to generate a plurality of CMDPs at S502. An intent is received at S503, then used to generate a finite state automaton at S504. At S505, MDP matching is used to determine a CMDP that encodes states of the environment using a subset of the set of features used by the RL agent. Subsequently, the CMDP and finite state automaton are used to compute a product (of CMDP output states and logic states, wherein the product contains all of the potential combinations of a CMDP output state and a logic state), at S506. At S507, the product model is used to check for unsafe actions, that is, actions having a probability above a predetermined threshold of causing a criterion from among the one or more criteria to be satisfied by the environment to be violated. In the event that no safe action is found, at S508 either the CMDP model is modified or the intent is modified. By contrast, where only some (not all) of the available actions are found to be unsafe, this information is used to filter the suggested actions obtained from the policy such that an action compliant with the intent is selected (at S509). In this example, at state S, the actions suggested by policy are A1, A2 and A3. The product model has found actions A1 and A2 to be unsafe, therefore action A3 is selected for implementation. A selection of potential intents which could be implemented in this example are as follows:

"SINR, network coverage and received signal quality are never degraded together". A logical specification corresponding to the above natural language statement, is $\Box(\neg(\text{SINRLow A covLow A quaLow}))$ "Antenna never overshoots and will eventually achieve high coverage and high quality". A logical specification corresponding to the above natural language statement, is $(\Diamond \text{covHigh}) \wedge (\Diamond \text{quaHigh}) \wedge (\Box \neg \text{osHigh})$ "High coverage and high quality over all futures". A logical specification corresponding to the above natural language statement, is $\Box(\Diamond \text{covHigh}) \wedge (\Diamond \text{quaHigh})$ "High SINR and high coverage and high capacity always". A logical specification corresponding to the above natural language statement, is $\Box(\Diamond \text{sinrHigh} \wedge \Diamond \text{covHigh} \wedge \Diamond \text{cap})$ Another example of a scenario in which methods in accordance with aspects of embodiments may be applied is, again in the environment of a telecommunications network, energy management control. In this use case, the actions proposed by a RL agent policy are energy management actions. The actions may include blocking radios in a site which improves energy efficiency. However this can sometimes cause a deterioration in network quality. Therefore, a "safety intent" is introduced to ensure that network KPIs remain in desired regions. The states here are network KPIs and cell site radio status. The safety intent may be used to derive a CMDP, and depending on the state identify actions that should be blocked or allowed so as to not compromise the safety intent. A further example of a scenario in which methods in accordance with aspects of embodiments may be applied is, again in the environment of a telecommunications network, link adaptation. Typically, communication systems are designed for worst-case channel conditions, resulting in under-utilization of the total channel capacity. Link adaptation techniques may be designed and deployed to improve the link throughput by increasing and decreasing the information rate under favorable channel conditions. Practically, this can be done by adjusting/controlling the transmission parameters such as Modulation and Coding Scheme (MCS), in order to maintain the block error rate within predefine constraints. The adjustment/control can be done by using trained RL agents, and methods in accordance with aspects of embodiments may be applied to impose logical intents on the RL agents.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method of operation for a node implementing reinforcement learning, RL, wherein the node instructs actions in an environment in accordance with a policy generated by a RL agent, wherein the RL agent models the environment and encodes a state of the environment using a set of features, the method comprising:

obtaining an intent, wherein the intent specifies one or more criteria to be satisfied by the environment;

determining a Markov Decision Process, MDP that encodes states of the environment using a subset of the set of features used by the RL agent;

generating a finite state automaton that represents the intent as a series of logic states;

computing a product of MDP output states and logic states, wherein the product contains potential combinations of a MDP output state and a logic state;

determining probabilities of actions from one or more suggested actions obtained from the policy causing a criterion to be violated using value iteration and Depth First Search (DFS) algorithms;

selecting an action to be performed on the environment from the one or more suggested actions obtained from the policy, the selection being based on the product of MDP output states and logic states; and controlling an antenna tilt based on the selected action.

2. An apparatus for implementing reinforcement learning, RL, wherein the apparatus is configured to instruct actions in an environment in accordance with a policy generated by a RL agent, wherein the RL agent models the environment and encodes a state of the environment using a set of features, and wherein the apparatus comprises a processing circuitry and a memory containing instructions executable by the processing circuitry, whereby the apparatus is operable to:

obtain an intent, wherein the intent specifies one or more criteria to be satisfied by the environment;

determine a Companion-Markov Decision Process, MDP CMDP, that encodes states of the environment using a subset of the set of features used by the RL agent;

generate a finite state automaton that represents the intent as a series of logic states;

compute a product of MDP CMDP output states and logic states, wherein the product contains all of the potential combinations of a MDP CMDP output state and a logic state;

determine probabilities of actions from one or more suggested actions obtained from the policy causing a criterion to be violated using value iteration and Depth First Search (DFS) algorithms;

select an action to be performed on the environment by the apparatus from the one or more suggested actions obtained from the policy, the selection being based on the product of MDP output states and logic states; and controlling an antenna tilt based on the selected action.

3. The apparatus of claim 2, configured to determine the MDP CMDP based on the features that influence the one or more criteria to be satisfied by the environment.

4. The apparatus of claim 3, wherein the determined MDP CMDP encodes states of the environment using the features that influence the one or more criteria to be satisfied by the environment as specified by the intent.

5. The apparatus of claim 2, wherein each of the determined MDP CMDP output states is linked to an action from among the suggested actions obtained from the policy.

6. The apparatus of claim 5 configured, when selecting an action, to determine if any actions, from the one or more suggested actions obtained from the policy, have a probability above a predetermined threshold of causing a criterion from among the one or more criteria to be satisfied by the environment to be violated, based on the combinations of a MDP CMDP output state and a logic state.

7. The apparatus of claim 6 configured such that, if a combination of a given MDP output state and given logic state has a probability above the predetermined threshold of causing a criterion from among the one or more criteria to be satisfied by the environment to be violated, actions linked to the given MDP output state are prevented from being selected.

8. The apparatus of claim 7, wherein the predetermined threshold is a 1% chance, or wherein the predetermined threshold is a 0% chance.

9. The apparatus of claim 6 configured such that, if it is determined that none of the suggested actions obtained from the policy have a probability below the predetermined threshold, the apparatus:

either selects a default safe action; or relaxes the criteria in the intent and repeats the determining, generating, computing and selecting steps using the relaxed criteria; or increases the predetermined threshold and repeats the selecting step; or selects the action having the lowest probability of causing a criterion from among the one or more criteria to be satisfied by the environment to be violated.

10. The apparatus of claim 2, configured to determine the MDP CMDP by selecting a pre-generated MDP from a group of MDPs, based on the one or more criteria specified by the intent.

11. The apparatus of claim 2, configured to determine the MDP by deriving a MDP based on the one or more criteria specified by the intent.

12. The apparatus of claim 2, wherein the environment is at least a part of a telecommunications network.

13. The apparatus of claim 12, wherein a base station of the telecommunications network comprises the apparatus.

14. The apparatus of claim 12, wherein the set of features encoding a state comprise one or more of: base station configuration measurements; signal to interference plus noise ratios, SINR; capacity measurements; coverage measurements; and Quality of Service, QoA measurements.

15. The apparatus of claim 12, wherein the suggested actions comprise one or more of: antenna configuration alterations; and transmission parameter adjustments.

16. The apparatus of claim 2, wherein the product contains all of the potential combinations of a MDP output state and a logic state.

* * * * *